United States Patent
Huang (10) Patent No.: US 12,414,146 B2
(45) Date of Patent: Sep. 9, 2025

(54) SCHEDULING METHOD FOR BEAMFORMING AND NETWORK ENTITY

(71) Applicant: Wistron Corporation, New Taipei (TW)

(72) Inventor: Yuan Fu Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 400 days.

(21) Appl. No.: 17/960,144

(22) Filed: Oct. 5, 2022

(65) Prior Publication Data
US 2024/0064794 A1   Feb. 22, 2024

(30) Foreign Application Priority Data
Aug. 16, 2022   (TW) .................................. 111130829

(51) Int. Cl.
| | | |
|---|---|---|
| H04W 72/543 | (2023.01) | |
| G06F 18/213 | (2023.01) | |
| G06N 3/044 | (2023.01) | |
| H04B 7/06 | (2006.01) | |
| H04L 25/03 | (2006.01) | |

(52) U.S. Cl.
CPC ........ *H04W 72/543* (2023.01); *G06F 18/213* (2023.01); *G06N 3/044* (2023.01); *H04B 7/0667* (2013.01); *H04L 25/03165* (2013.01)

(58) Field of Classification Search
CPC . H04W 72/543; H04W 16/28; H04W 72/046; G06F 18/213; G06N 3/044; H04B 7/0667; H04B 7/0456; H04B 7/0695; H04L 25/03165

USPC ......................................................... 375/260
See application file for complete search history.

(56) References Cited

U.S. PATENT DOCUMENTS

| | | | |
|---|---|---|---|
| 2020/0314821 A1 | 10/2020 | Tofighbakhsh et al. | |
| 2021/0336687 A1 | 10/2021 | Pezeshki et al. | |
| 2022/0060238 A1* | 2/2022 | Jassal | H04B 7/026 |
| 2023/0308157 A1* | 9/2023 | Bi | H04B 7/0695 |

FOREIGN PATENT DOCUMENTS

| | | |
|---|---|---|
| CN | 113837461 | 12/2021 |
| WO | 2020065384 | 4/2020 |
| WO | 2022087190 | 4/2022 |

OTHER PUBLICATIONS

"Office Action of Taiwan Counterpart Application", issued on Jun. 13, 2023, p. 1-p. 14.

(Continued)

*Primary Examiner* — Fitwi Y Hailegiorgis
(74) *Attorney, Agent, or Firm* — JCIPRNET (57) ABSTRACT

A scheduling method for beamforming and a network entity are provided. In the method, a future location is predicted according to one or more past locations of a user equipment (UE). A precoder is determined according to the future location. A direction of a beam of a base station is determined according to the precoder. The past locations are locations of the UE at one or more past time points, and the future location is a location of the UE at a future time point. The precoder reflects a downlink channel state at the future time point. Accordingly, the communication quality can be improved.

20 Claims, 9 Drawing Sheets

(56) References Cited

OTHER PUBLICATIONS

Chang Liu et al., "Location-aware Predictive Beamforming for UAV Communications: A Deep Learning Approach", IEEE Wireless Communications Letters, Dec. 16, 2020, pp. 1-4, vol. 10, Issue. 3.

Luc Le Magoarou et al., "Deep Learning for Location Based Beamforming With NLOS Channels", arXiv:2201.01386v1, Dec. 2021, pp. 1-5.

Chang Liu et al., "Location-Aware Predictive Beamforming for UAV Communications: A Deep Learning Approach", IEEE Wireless Communications Letters, Mar. 2021, pp. 668-672.

"Search Report of Europe Counterpart Application", issued on Aug. 11, 2023, p. 1-p. 9.

"Office Action of Japan Counterpart Application", issued on Sep. 5, 2023, p. 1-p. 2.

\* cited by examiner

SCHEDULING METHOD FOR BEAMFORMING AND NETWORK ENTITY

CROSS-REFERENCE TO RELATED APPLICATION

This application claims the priority benefit of Taiwan application serial no. 111130829, filed on Aug. 16, 2022. The entirety of the above-mentioned patent application is hereby incorporated by reference herein and made a part of this specification.

BACKGROUND

Technical Field

The disclosure relates to a communication technology, and more particularly to a scheduling method for beamforming and a network entity.

Description of Related Art

The self-driving car (for example, an autonomous mobile robot (AMR) or an automated guided vehicle (AGV) utilized in factory automation) of today replaces human labor and perform the work of transporting materials and items on production lines. The wireless communication used to control the AMR requires low latency and high reliability. For example, the 5G next generation Node B (gNB) must maintain the optimal communication quality for the AGV in action to avoid communication quality degradation. Therefore, the 5G mobile communication technology proposes beamforming. The beamforming may be classified into analog and digital beamforming, and is used to emit a preferred signal to a receiving end in a specific direction. For the application of the AGV, the beamforming may perform directional communication for individual AGVs. For the digital beamforming, the key lies in the use of a precoding matrix. Using the precoding matrix to precode a signal may determine the direction of a beam, and the signal reception quality within the range corresponding to the direction is preferred. The selection or the determination of the precoding matrix depends on the channel state information (CSI) of the location where the receiving end (for example, the AGV or a mobile device) is located. Therefore, the precoding matrix is a key factor affecting the effect of the beamforming.

In addition, the CSI includes a channel quality indicator (CQI), a rank indication (RI), a layer indicator (SLI), a precoding matrix indication (PMI), a CSI resource indication (CRI), a synchronization signal/physical broadcast channel block resource indicator (SS/PBCH resource indicator, SSBRI), and an L1-reference signal receiving power (RSRP). A user equipment (UE) reports the CSI to the gNB, and the gNB performs scheduling adjustment and work related to beam management according to the reported content of the CSI. Therefore, the CSI plays an important role in communication. The computation of communication estimation on the 5G new radio (NR) system needs to send pilot symbols as a basis for estimating the CSI. The pilot symbols occupy radio resources, thereby causing excessive resource overhead and limiting the efficiency of the 5G NR system. In addition, reporting the CSI to the gNB through the UE causes time delay. Therefore, the reported CSI cannot reflect the channel state of the UE in real time.

SUMMARY

The disclosure provides a scheduling method for beamforming and a network entity, which can estimate a future channel state, and provide an appropriate direction of a beam accordingly.

A scheduling method for beamforming according to an embodiment of the disclosure is applicable to a network entity. The scheduling method includes the following steps. A future location is predicted according to one or more past locations of a user equipment (UE). A precoder is determined according to the future location. A direction of a beam of a base station at a future time point is determined according to the precoder. The past locations are locations of the user equipment at one or more past time points, and the future location is a location of the user equipment at the future time point. The precoder reflects a downlink channel state at the future time point.

A scheduling method for beamforming according to an embodiment of the disclosure is applicable to a network entity. The scheduling method includes the following steps. A future location and a future channel state are predicted according to one or more past locations and one or more past channel states of a user equipment. A precoder is determined according to the future location and the future channel state. A direction of a beam of a base station at a future time point is determined according to the precoder. The past location is a location of the user equipment at one or more past time points, the past channel state is a downlink channel state at the past time point, the future location is a location of the user equipment at the future time point, and the future channel state is a downlink channel state at the future time point. The precoder reflects a downlink channel situation at the future time point.

A network entity according to an embodiment of the disclosure includes (but is not limited to) a memory and a processor. The memory is used to store a code. The processor is coupled to the memory. The processor is configured to load and execute the code to implement the following steps. A future location is predicted according to one or more past locations of a user equipment. A precoder is determined according to the future location. A direction of a beam of a base station at a future time point is determined according to the precoder. The past locations are locations of the user equipment at one or more past time points, and the future location is a location of the user equipment at the future time point. The precoder reflects a downlink channel state at the future time point.

Based on the above, according to the scheduling method for beamforming and the network entity according to the embodiments of the disclosure, the location of the user equipment at the future time point is predicted, and the precoder reflected by the future channel state and the direction of the beam of the base station are determined accordingly. In this way, even if there is no reported CSI, an appropriate precoding matrix may still be provided, thereby improving the utilization of radio resources and avoiding signaling delay.

In order for the features and advantages of the disclosure to be more comprehensible, the following specific embodiments are described in detail in conjunction with the drawings.

DETAILED DESCRIPTION OF DISCLOSED EMBODIMENTS

Figure 1A:
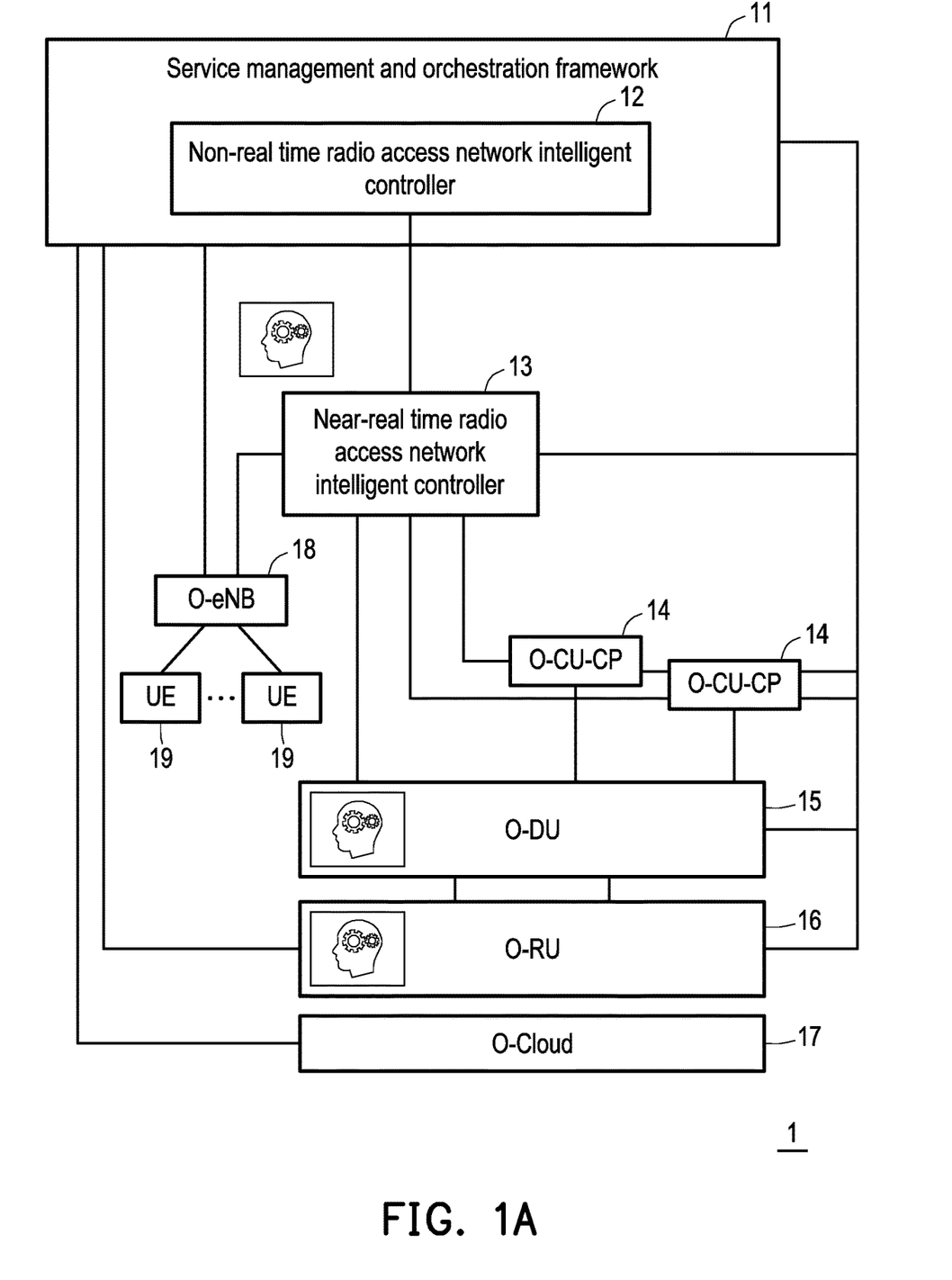
FIG. 1A is a framework diagram of an open radio access network (O-RAN) system according to an embodiment of the disclosure.

FIG. 1A is a framework diagram of an open radio access network (O-RAN) system 1 according to an embodiment of the disclosure. Please refer to FIG. 1A. The open radio access network system 1 includes (but is not limited to) a service management and orchestration (SMO) framework 11, a non-real time radio access network intelligent controller (RIC) 12, a near-real time RIC 13, an open radio access network central unit (O-CU) 14 (for a user plane (UP) and/or a control plane (CP)), an open radio access network distributed unit (O-DU) 15, an open radio access network remote unit (O-RU) 16, an open-cloud platform 17, an open radio access network evolved Node B (O-eNB) 18, and a user equipment (UE) 19.

The SMO framework 11 provides a management service of a network facility, such as fault, configuration, accounting, performance, security (FCAPS) management, resource management and load management of the open-cloud platform 17, and management of the O-RU 16.

The non-real time RIC 12 is located within the SMO framework 11. The functions of the non-real time RIC 12 include analyzing data, training a machine learning model, providing enrichment information, and setting a policy.

The near-real time RIC 13 connects the non-real time RIC 12 and the SMO framework 11. The near-real time RIC 13 is located within a radio access network (RAN) and is used to receive and analyze real-time information from the RAN, combine additional information provided by the non-real time RIC 12, and utilize the machine learning model deployed by the non-real time RIC 12 to monitor or predict changes in a connection status of the user equipment 19. When the near-real time RIC 13 detects that the policy set by the non-real time RIC 12 cannot be met, parameters of the RAN may be adjusted, such as adjusting resource allocation, transmission rate, transmission priority, switching connection point, and changing hands. In this way, the established policy target can be maintained.

The O-CU 14 connects the near-real time RIC 13 and the SMO framework 11. The O-CU 14 is responsible for logical nodes of radio resource control (RRC), service data adaptation protocol (SDAP), and packet data convergence protocol (PDCP). The O-CU 14 for the control plane (CP) is responsible for the logical nodes of the control plane part of the RRC and the PDCP. The O-CU 14 for the user plane (UP) is responsible for the logical nodes of the user plane part of the SDAP and the PDCP.

The O-DU 15 connects the O-CU 14 and the SMO framework 11. The O-DU 15 is responsible for logical nodes of radio link control (RLC), media access control (MAC), and physical-high layer.

The O-RU 16 connects the O-DU 15 and the SMO framework 11. The O-RU 16 is responsible for logical nodes of physical-low layer and radio frequency (RF).

The open-cloud platform 17 is connected to the SMO framework 11. The open-cloud platform 17 is responsible for a physical facility node or data of all or some functions within the O-RAN system 1, and provides a supporting software element, a hardware resource, and appropriate management and orchestration functions for each node. For example, the function of each node is deployed through network functions virtualization (FNV), a virtual machine, or a container.

The O-eNB 18 connects the non-real time RIC 12 and the SMO framework 11. The O-eNB 18 is a physical device of the RAN. The O-eNB 18 may also be a next generation Node B (gNB), a base transceiver system (BTS), a relay, a repeater, or other base stations. The "O-" in the O-eNB 18 represents being located at O-RAN. Therefore, the O-eNB 18 is collectively referred to as the base station hereinafter.

Figure 1B:
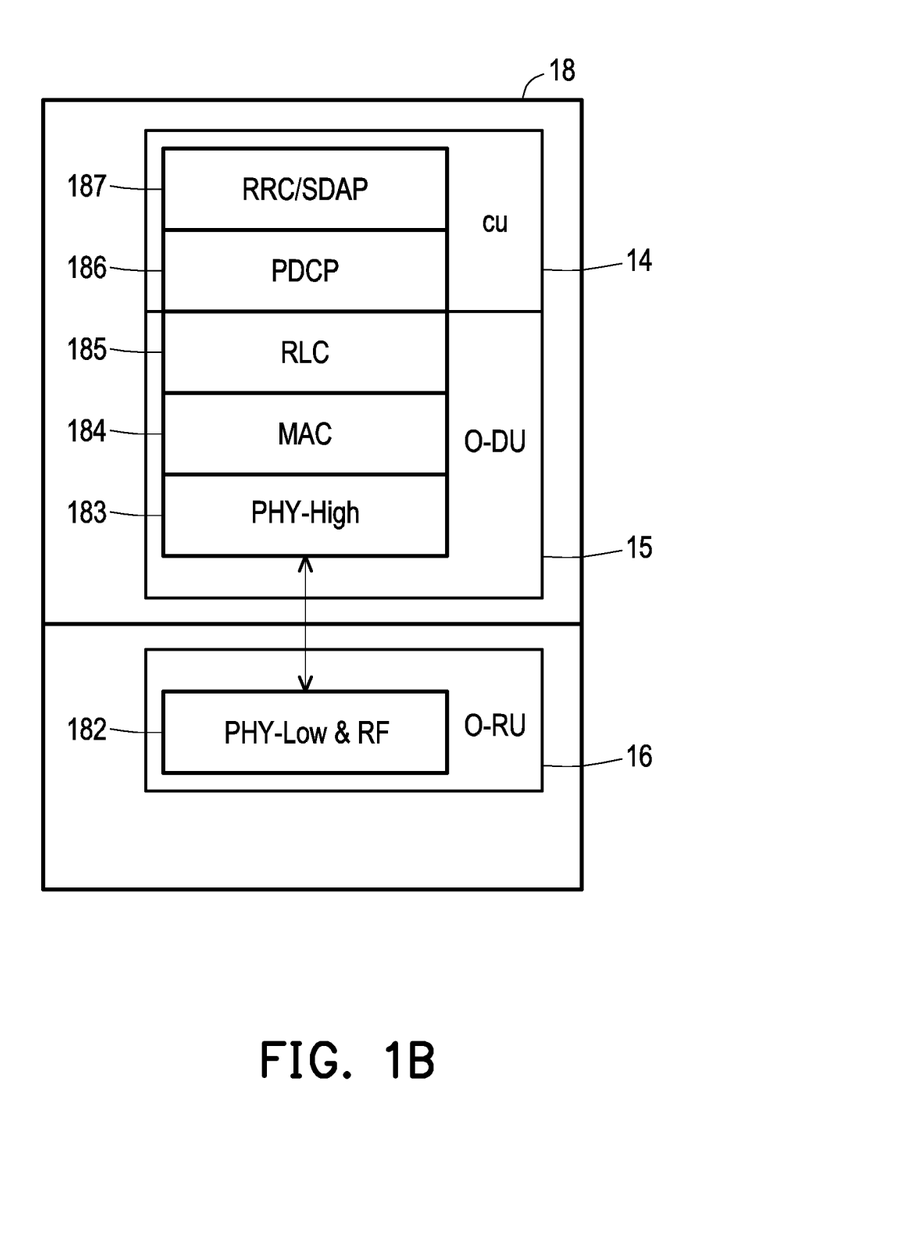
FIG. 1B is a schematic diagram of functional split according to an embodiment of the disclosure.

In an embodiment, the open radio access network system 1 may provide functional split. For example, FIG. 1B is a schematic diagram of functional split according to an embodiment of the disclosure. Please refer to FIG. 2. A physical-low and radio frequency layer 182 (for example, for functions such as precoding, fast Fourier transform, and digital and analog conversion) in a communication protocol of the O-eNB 18 is implemented by the O-RU 16, a physical-high layer 183 (for example, for functions such as channel estimation, precoding, modulation, and encoding/decoding), a MAC layer 184, and an RLC layer 185 are implemented by the O-DU 15, and a PDCP layer 186 and an RRC/SDCP layer 187 are implemented by the O-CU 14.

It should be noted that the split manner shown in FIG. 1B (for example, Split option 7-2x) is only for illustration, and there are other split manners in other implementations. For example, the physical-high layer 183 and the physical-low and radio frequency layer 182 are both implemented by the O-RU 16.

The user equipment (UE) 19 is communicatively connected to the O-eNB 18. The user equipment 19 may be a mobile station, an advanced mobile station (AMS), a telephone device, a customer premises equipment (CPE), a wireless sensor, a wearable device, a vehicle-mounted system, a robot, or other devices.

Implementing a machine learning service in the O-RAN system 1 may be achieved through the following two manners. The first is to import a machine learning operation tool into the non-real time RIC 12, and the second is to integrate a machine learning service server (supporting machine learning training, prediction, and management of model monitoring) connected to a third party. However, operations such as data collection, data preprocessing, training, prediction, model management, and performance monitoring may still be distributed to the near-real time RIC 13, the O-CU 14, the O-DU 15, and/or the O-eNB 18 for implementation.

Figure 2:
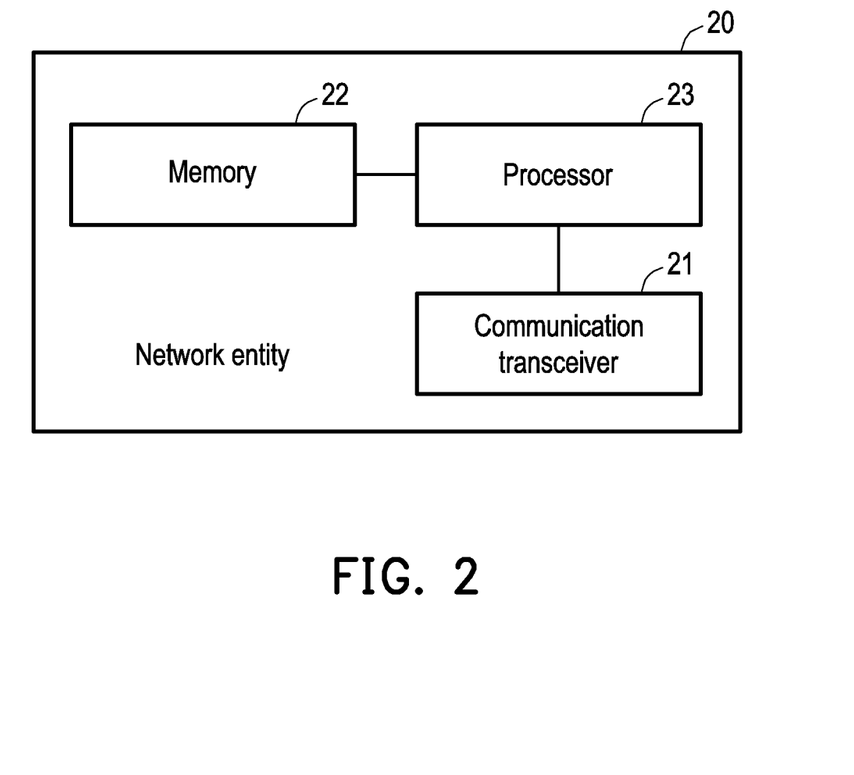
FIG. 2 is a block diagram of elements of a network entity according to an embodiment of the disclosure.

FIG. 2 is a block diagram of elements of a network entity 20 according to an embodiment of the disclosure. Please refer to FIG. 2. The network entity 20 may be the near-real time RIC 13, the O-DU 15, the O-RU 16, or the O-eNB 18 of FIG. 1A, other core network entities (for example, access and mobility management function (AMF) or mobility management entity (MME)), or other hardware devices of base stations.

The network entity 20 includes (but is not limited to) a communication transceiver 21, a memory 22, and a processor 23.

The communication transceiver 21 may be a wireless transceiver with one or more antennas, a receiver 32, a transmitter, and an analog-to-digital or digital-to-analog converter, or may also be a transmission interface (for example, Ethernet or a fiber optic network) between base stations or between the network entities 20. In an embodiment, the communication transceiver 21 is used to transmit data to other devices or receive data from other devices.

The memory 22 may be any type of fixed or removable random access memory (RAM), read-only memory (ROM), flash memory, similar elements, or a combination of the above elements. The memory 22 stores a code, a device configuration, a codebook, and buffered or permanent data, and stores a software module related to various communication protocols, such as the RRC, the PDCP, the RLC, the MAC, and the physical layer.

The processor 23 is coupled to the memory 22. The processor 23 is configured to process a digital signal and execute a program according to an exemplary embodiment of the disclosure, and may access or load data and a software module stored in the memory 22. In an embodiment, the function of the processor 23 may be implemented by using a programmable unit, such as a central processing unit (CPU), a microprocessor, a microcontroller, a digital signal processing (DSP) chip, and a field programmable gate array (FPGA). In an embodiment, the function of the processor 23 may also be implemented by an independent electronic device or an integrated circuit (IC). In an embodiment, the operation of the processor 23 may also be implemented by software.

Hereinafter, the method according to the embodiment of the disclosure will be described in conjunction with each element in the network entity 20. Each process of the method according to the embodiment of the disclosure may be adjusted according to the implementation situation and is not limited herein.

Figure 3:
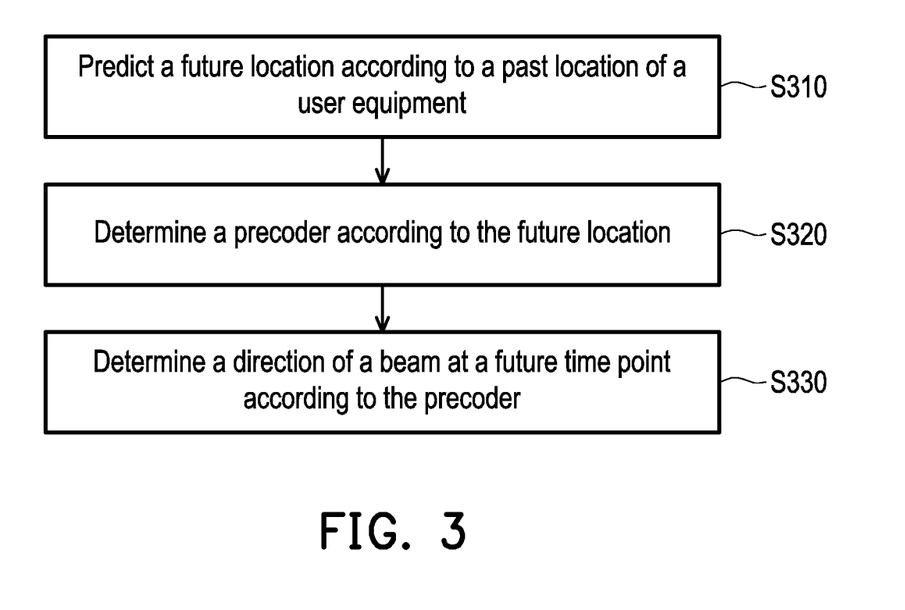
FIG. 3 is a flowchart of a scheduling method for beamforming according to an embodiment of the disclosure.

FIG. 3 is a flowchart of a scheduling method for beamforming according to an embodiment of the disclosure. Please refer to FIG. 3. The processor 23 predicts the future location according to one or more past locations of the user equipment 19 (Step S310). Specifically, the one or more past locations are locations of the user equipment 19 at one or more past time points. For example, if a certain time point is t, the past locations may be the locations at time points t−5, t−4, t−3, t−2, and t−1. The past locations arranged in time series may be separated by the same or different periods. The future location is a location of the user equipment 19 at a future time point. Taking the past locations being the locations at the time points t−5, t−4, t−3, t−2, and t−1 as an example, the future location may be the location at a time point t, t+1, or t+2. In addition, the locations may be in latitude and longitude, relative locations, or coordinate format of a particular coordinate system. In an embodiment, the processor 23 may estimate the location of the user equipment 19 through a manner such as received signal strength, satellite positioning, and triangulation.

The future location may be defined as:

$$u_k = u_{k-1} + v_{k-1} \Delta T + \Lambda_{k-1} \quad (1)$$

where $u_k$ is a location of the user equipment 19 at a future time point k, $u_{k-1}$ is a location of the user equipment 19 at a past time point k−1 that has a time difference $\Delta T$ from the future time point, $v_{k-1}$ is a speed of the user equipment 19 at the past time point k−1, and $\Lambda_{k-1}$ is an undetermined factor at the past time point k−1.

In an embodiment, the processor 23 inputs the one or more past locations to a location prediction model, and predicts the future location through the location prediction model. The location prediction model is based on a machine learning algorithm. There are many types of machine learning algorithms, such as a deep neural network (DNN), a multilayer perceptron (MLP), or a support vector machine (SVM). In an embodiment, the location prediction model may be used to infer the location. The machine learning algorithm may analyze training samples to obtain a regular pattern from therefrom, thereby predicting unknown data through the regular pattern. In general, the future location is usually related to a trajectory formed by the past locations and behaviors at the past time points. The location prediction model is a machine learning model constructed after learning to infer data to be evaluated (for example, the past locations) accordingly.

Figure 4:
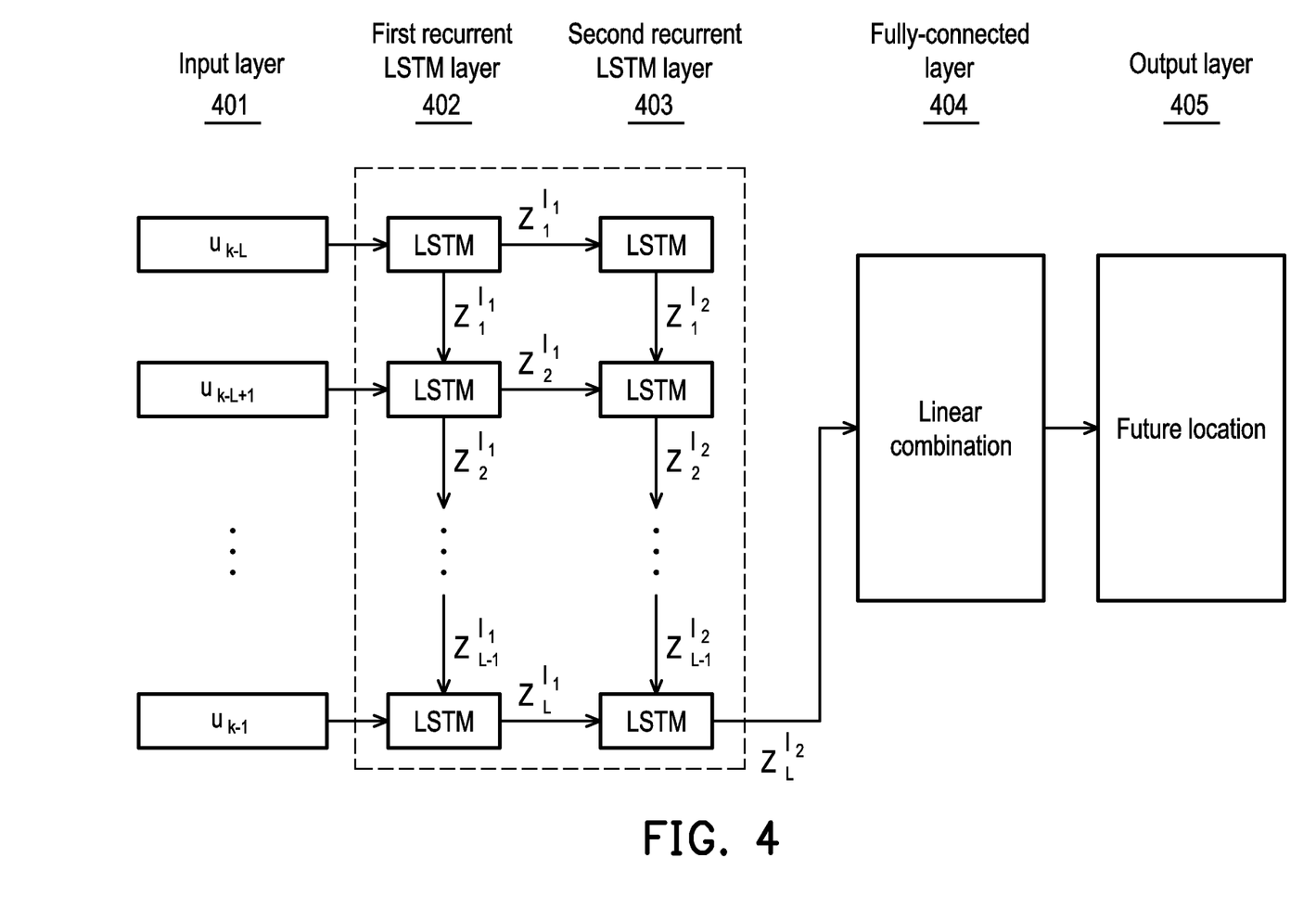
FIG. 4 is a schematic diagram of a location prediction model according to an embodiment of the disclosure.

FIG. 4 is a schematic diagram of a location prediction model according to an embodiment of the disclosure. Please refer to FIG. 4. In an embodiment, the location prediction model is a recurrent neural network (LRNet) based on a long short-term memory (LSTM) layer. The location prediction model includes an input layer 401, a first recurrent LSTM layer 402, a second recurrent LSTM layer 403, a fully-connected (FC) layer 404, and an output layer 405.

The input layer 401 obtains multiple past locations $u_{k-L}$, $u_{k-L+1}$, ..., $u_{k-1}$, where L is a positive integer greater than 1. The first recurrent LSTM layer 402 includes multiple LSTM models, and the second recurrent LSTM layer 403 includes multiple LSTM models. The LSTM models have a one-to-one correspondence with the past locations $u_{k-L}$, $u_{k-L+1}$, ..., $u_{k-1}$ in the input layer 401. The LSTM model is a temporal recurrent neural network (RNN) and is used to perform feature extraction. In some application scenarios, an LSTM module is suitable for processing and predicting an important event with long interval and delay in time series, such as predicting a trajectory or a future location. The first recurrent LSTM layer 402 and the second recurrent LSTM layer 403 may capture a movement characteristic that changes with time. The movement characteristic may be speed, acceleration, step size, and/or direction (that is, a feature from the feature extraction).

The processor 23 may transmit an output thereof to a first LSTM model in the second recurrent LSTM layer 403 and a second LSTM model (corresponding to the next time point of the first LSTM model) in the first recurrent LSTM layer 402 through a first LSTM model in the first recurrent LSTM layer 402. For example, an output $z_1^{l_1}$ (where l1 represents belonging to the first recurrent LSTM layer 402) of the first LSTM model from top to bottom of the drawing in the first recurrent LSTM layer 402 is transmitted to the first LSTM model from top to bottom of the drawing in the second recurrent LSTM layer 403 and is stored in the second LSTM model of the first recurrent LSTM layer 402. By analogy, an output $z_2^{l_1}$ of the second LSTM model of the first recurrent LSTM layer 402 is transmitted to the second LSTM model of the second recurrent LSTM layer 403 and a third LSTM model (not shown) of the first recurrent LSTM layer 402. Since an L-th LSTM model of the first recurrent LSTM layer 402 has no corresponding LSTM model at the next time point, an output $z_L^{l_1}$ thereof is only transmitted to an L-th LSTM model of the second recurrent LSTM layer 403.

In addition, the processor 23 transmits the output thereof to the second LSTM model (corresponding to the next time point of the first LSTM model) in the second recurrent LSTM layer 403 through the first LSTM model in the second recurrent LSTM layer 403. For example, an output $z_1^{l_2}$ (where l2 represents belonging to the second recurrent LSTM layer 403) of the first LSTM model from top to bottom of the drawing in the second recurrent LSTM layer 403 is stored in a second LSTM model in the second recurrent LSTM layer 403. By analogy, an output $z_2^{l_1}$ of the second LSTM model of the second recurrent LSTM layer 403 is stored in the third LSTM model (not shown) of the second recurrent LSTM layer 403. Since the L-th LSTM model of the second recurrent LSTM layer 403 does not have a corresponding LSTM model at the next time point, an output $z_L^{l_2}$ thereof is only transmitted to the fully-connected layer 404, wherein the output $z_L^{l_2}$ may be defined as:

$$z_L^{l_2} = f_\lambda(U_k) \qquad (2)$$

where $U_k$ is a set of the past locations $u_{k-L}, u_{k-L+1}, \ldots, u_{k-1}$ (for example, $U_k = [u_{k-L}, \ldots, u_{k-1}]$) of the user equipment 19, and $f_\lambda(\ )$ is a nonlinear function using a parameter $\lambda$ (for implementing the first recurrent LSTM layer 402 and the second recurrent LSTM layer 403)

The processor 23 linearly combines the output $z_L^{l_2}$ of the second recurrent LSTM layer 403 through the fully-connected layer 404 to obtain the future location (that is, output the future location through the output layer 405). The linear combination is defined as follows:

$$\tilde{u}_k = \sigma(W f_\lambda(U_k) + b) \qquad (3)$$

where $\tilde{u}_k$ is an estimated future location, $\sigma(\ )$ represents a linear activation function, W is a weight, and b is a bias.

Please refer to FIG. 3. The processor 23 determines a precoder according to the future location (Step S320). Specifically, the precoder reflects a downlink channel state at the future time point. The downlink refers to a transmission direction from the O-eNB 18 to the user equipment 19. The precoder enables multi-stream transmission in a multi-antenna system to implement beamforming. In traditional single-stream transmission, the same signal is emitted through each antenna. In order to increase the signal power of the overall receiving antenna, the multi-stream transmission of the precoder is required. Executing precoding requires the channel state, and the precoder according to the embodiment of the disclosure is determined based on the future location at the future time point, so the channel state at the future time point is required.

In an embodiment, the processor 23 may input the future location in a precoding prediction model, and predict a candidate precoder that conforms to the downlink channel state at the future time point through the precoding prediction model. The precoding prediction model is based on a machine learning algorithm. Examples of the machine learning algorithm are described above and will not be repeated here. In an embodiment, the precoding prediction model may be used to infer a precoding matrix. Generally speaking, the downlink channel state is strongly related to the location of the user equipment 19, and the precoding is based on the downlink channel state. The precoding prediction model is a machine learning model constructed after learning to infer data to be evaluated (for example, the future location) accordingly.

Figure 5:
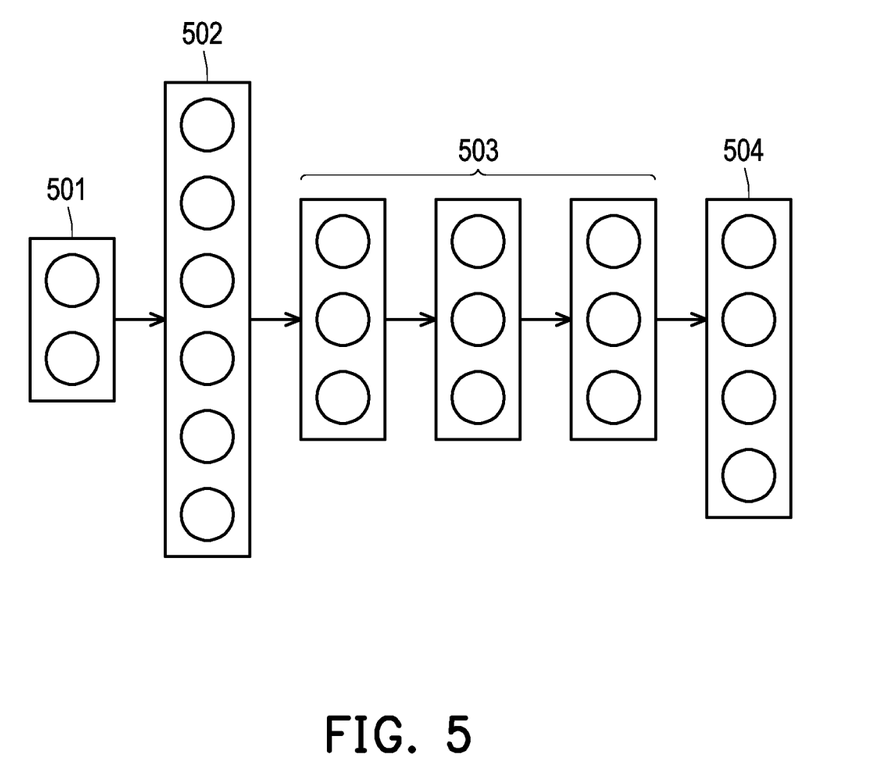
FIG. 5 is a schematic diagram of a precoding prediction model according to an embodiment of the disclosure.

FIG. 5 is a schematic diagram of a precoding prediction model according to an embodiment of the disclosure. Please refer to FIG. 5. The precoding prediction model includes an input layer 501, a feature extraction layer 502, a multilayer perceptron (MLP) 503, and an output layer 504.

The input layer 501 obtains the future location (for example, the future location $\tilde{u}_k$ of Equation (3)) of the user equipment 19 at the future time point.

The processor 23 obtains multiple random Fourier features (RFFs) from the future location through the feature extraction layer 502. The feature extraction layer 502 may map the future location to a Euclidean space with lower dimension through a mapping function, and obtain an estimated value of a kernel function by taking the inner product of coordinates of the future location in the Euclidean space. In the Fourier transform of the kernel function, a randomly extracted sine function may be used to implement the mapping.

In addition, the processor 23 determines the candidate precoder according to the random Fourier features through the multilayer perceptron 503. The multilayer perceptron 503 may map one set of input vectors to another set of input vectors. The multilayer perceptron 503 is composed of multiple node layers, and each layer is fully connected to the next layer. Except for a node in an input layer of the multilayer perceptron 503, the remaining nodes are neurons (or processing units) with nonlinear activation functions. In an embodiment, the multilayer perceptron 503 may use a rectified linear unit (ReLU) excitation function to implement functions of the neurons. An output of the multilayer perceptron 503 is the candidate precoder.

In an embodiment, the performance of the candidate precoder may be evaluated based on the normalized correlation $\eta$ between a candidate precoder W (represented by the precoding matrix) and a channel state h:

$$\eta \triangleq \frac{|W^H h|^2}{\|h\|_2^2} \qquad (4)$$

where a normalized correlation $\eta$ has a value of between 0 and 1. If the normalized correlation is closer to 1, the performance of the candidate precoder W is preferred. The performance may be related to an error rate, a receiving power, or a time delay.

In an embodiment, during a training phase, the precoding prediction model may establish a cost function CF based on the normalized correlation $\eta$:

$$CF \triangleq 1 - \frac{1}{N} \Sigma_{i=1}^{N} \frac{|W_i^H h_i|^2}{\|h_i\|_2^2} \qquad (5)$$

where $W_i$ is an i-th precoder in a training sample, $h_i$ is an i-th channel state in the training sample, and N is the number of precoders or channel states in the training sample.

Figure 6:
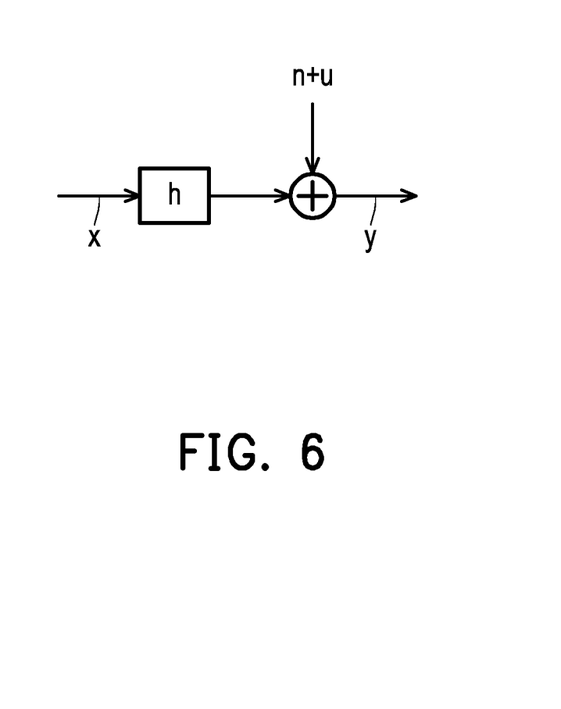
FIG. 6 is a schematic diagram of a signal through a channel according to an embodiment of the disclosure.

FIG. 6 is a schematic diagram of a signal through a channel according to an embodiment of the disclosure. Please refer to FIG. 6, where x represents a signal of a transmission end (for example, the O-eNB 18), y represents a signal of a receiving end (for example, the user equipment 19), h is the downlink channel state, n is the noise, and u is the interference. Therefore, the relationship between the signals of the transmission end and the receiving end may be obtained:

$$y = hx + u + n \qquad (6)$$

Figure 7:
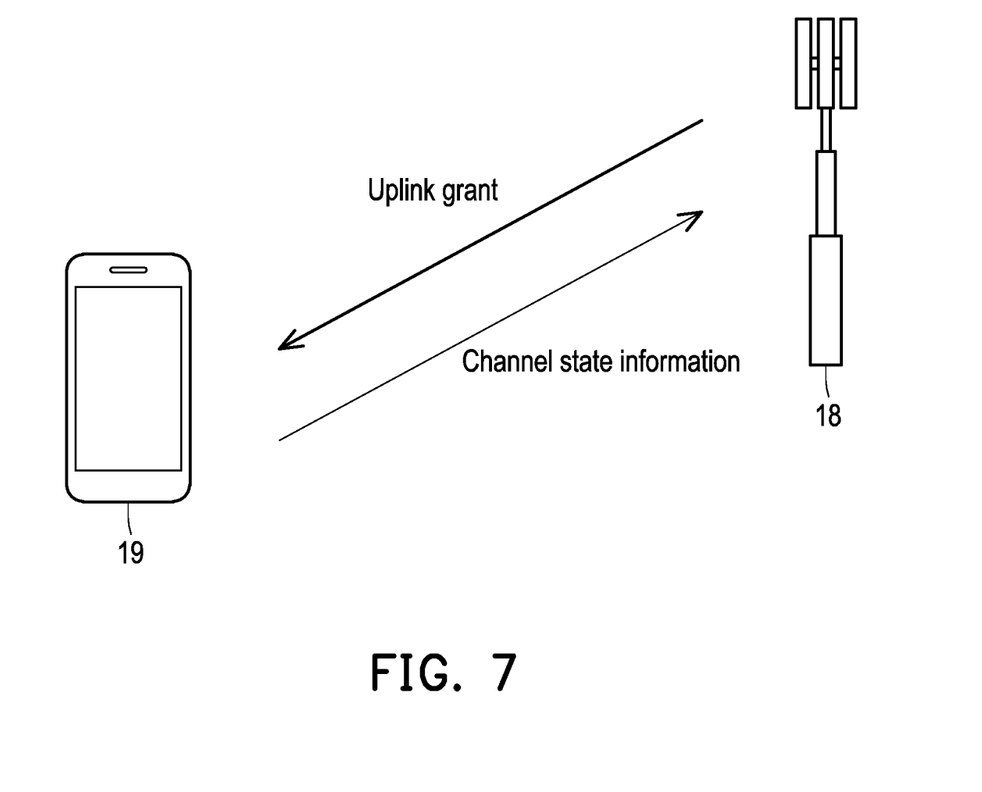
FIG. 7 is a schematic diagram of signaling obtained from channel state information according to an embodiment of the disclosure.

FIG. 7 is a schematic diagram of signaling obtained from channel state information according to an embodiment of the disclosure. Please refer to FIG. 7. The O-eNB 18 may adjust the precoding according to channel state information (CSI) reported by the user equipment 19 to transmit data to the user equipment 19. Since the downlink channel state between the user equipment 19 and the O-eNB 18 is associated with the location of the user equipment 19, the downlink channel state at the future time point may be predicted in advance by using the future location at the future time point, and the corresponding precoder (for example, the precoding matrix) is generated accordingly and the precoding is performed. Even if the user equipment 19 does not report the channel state, the O-eNB 18 may still perform the precoding according to the downlink channel state at the future time point, thereby improving the efficiency. The embodiment of the disclosure may also be referred to as scheduling of location-aware beamforming of a machine learning unit.

Figure 8:
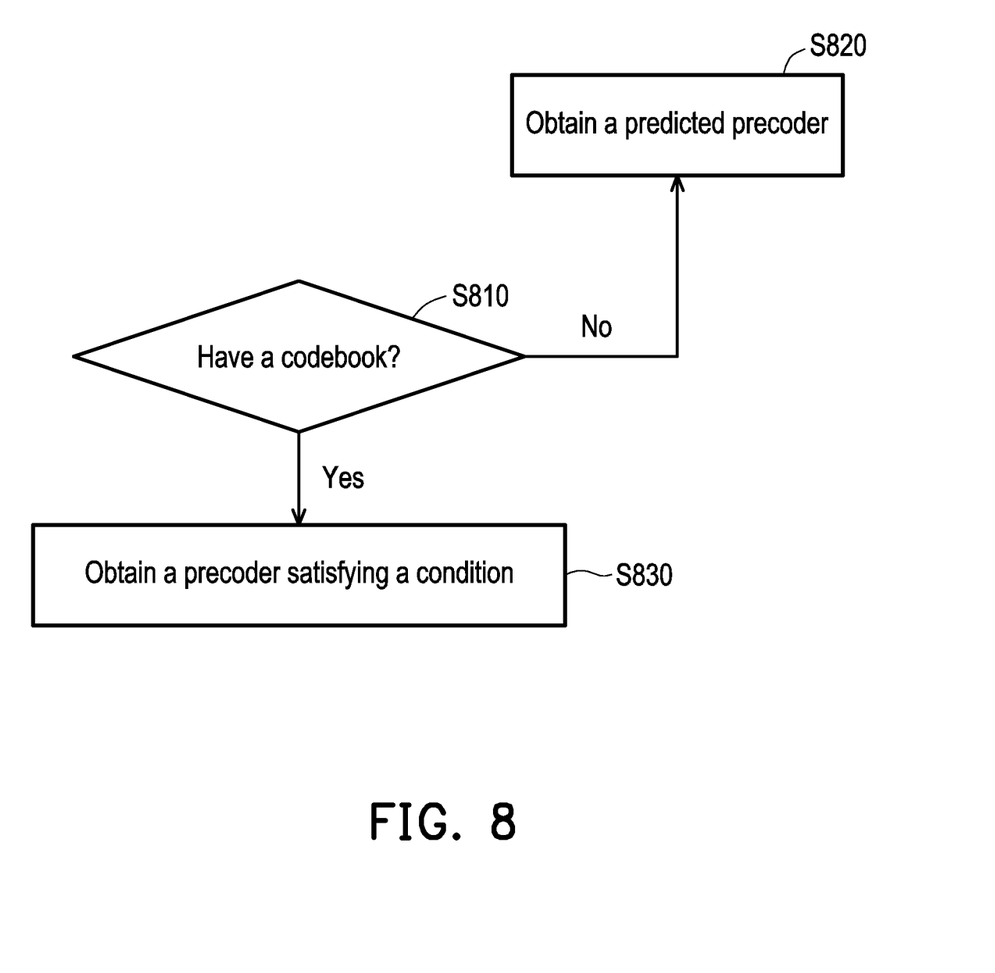
FIG. 8 is a flowchart of generating a precoder according to an embodiment of the disclosure.

In an embodiment, the processor 23 may determine the precoder according to the candidate precoder. FIG. 8 is a flowchart of generating a precoder according to an embodiment of the disclosure. Please refer to FIG. 8. The processor 23 may judge whether the memory 22 or other databases have a codebook (Step S810). In response to not having the codebook, the processor 23 may directly use the candidate precoder as the precoder (Step S820). For example, an output of the precoding prediction model is used as the precoder.

In response to having the codebook, the processor 23 may obtain the precoder that satisfies a condition (Step S830). In an embodiment, the processor 23 generates the precoder according to the one with the highest correlation with the candidate precoder among multiple precoding matrices in the codebook. For example, the processor 23 finds a precoding matrix (for example, $h_i$) that maximizes the normalized correlation (for example, $$\frac{|W_i^H h_i|^2}{\|h_i\|_2^2})$$

in the codebook. That is, if the normalized correlation is the maximum, the condition is satisfied.

In another embodiment, whether there is the codebook, the processor 23 may directly use the candidate precoder as the precoder.

Please refer to FIG. 3. The processor 23 determines a direction of a beam of a base station (for example, the O-eNB 18) at the future time point according to the precoder (Step S330). Specifically, the precoding is a technical measure to implement digital beamforming. If signals on multiple antennas of the base station are precoded, the signals of certain directions/angles will achieve constructive interference, and the signals of other directions will achieve destructive interference, thereby forming the beam. Since the embodiment of the disclosure can predict the future location of the user equipment 19 at the future time point, a main lobe of the beam may be approximately toward the user equipment 19 at the future time point.

In a mobile communication system, channels change rapidly. In particular, when the user equipment 19 is moving at a high speed, if the user equipment 19 feeds back channel information too late, the feedback information may not be suitable for the current channel environment, thereby causing a signal to interference plus noise ratio (SINR) to decrease, and the channel quality also decreases, thereby reducing the symbol coding rate for modulation. In addition, although the codebook mechanism can save the amount of feedback information, the optimal precoding matrix in the codebook still needs to be searched for as a feedback index, thereby increasing the computational complexity of the receiving end (for example, the user equipment 19).

Figure 9:
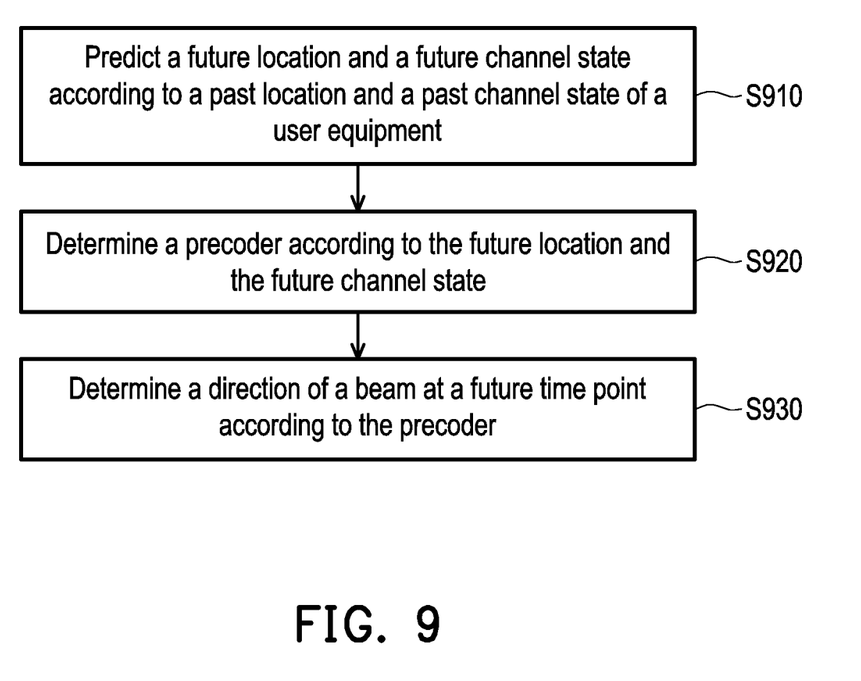
FIG. 9 is a flowchart of a scheduling method for beamforming according to an embodiment of the disclosure.

FIG. 9 is a flowchart of a scheduling method for beamforming according to an embodiment of the disclosure. Please refer to FIG. 9. The processor 23 predicts the future location and a future channel state according to the one or more past locations and one or more past channel states of the user equipment 19 (Step S910). Specifically, the difference from Step S310 of FIG. 3 is that the determination of the future location also refers to the one or more past channel states (corresponding to the precoder/matrix used at the past time point). The one or more past channel states are the downlink channel states at the one or more past time points. In addition, the embodiment also predicts the future channel state to conform to the requirement of the rapidly changing channel states. The future channel state is the downlink channel state at the future time point.

In an embodiment, the processor 23 inputs the one or more past locations and past channel states to a location and channel prediction model, and predicts the future location and the future channel state through the location and channel prediction model. The location and channel prediction model is based on a machine learning algorithm. There are many types of machine learning algorithm, such as the DNN, the MLP, or the SVM. In an embodiment, the location and channel prediction model may be used to infer the location and the channel state. The machine learning algorithm may analyze training samples to obtain a regular pattern therefrom, so as to predict unknown data through the regular pattern. Generally speaking, the future location is usually related to the trajectory formed by the past locations and the behaviors at the past time points, the future channel state is also related to the past channel states, and the locations may be reflected in the channel states. The location and channel prediction model is a machine learning model constructed after learning to infer data to be evaluated (for example, the past locations and the past channel states) accordingly.

Figure 10:
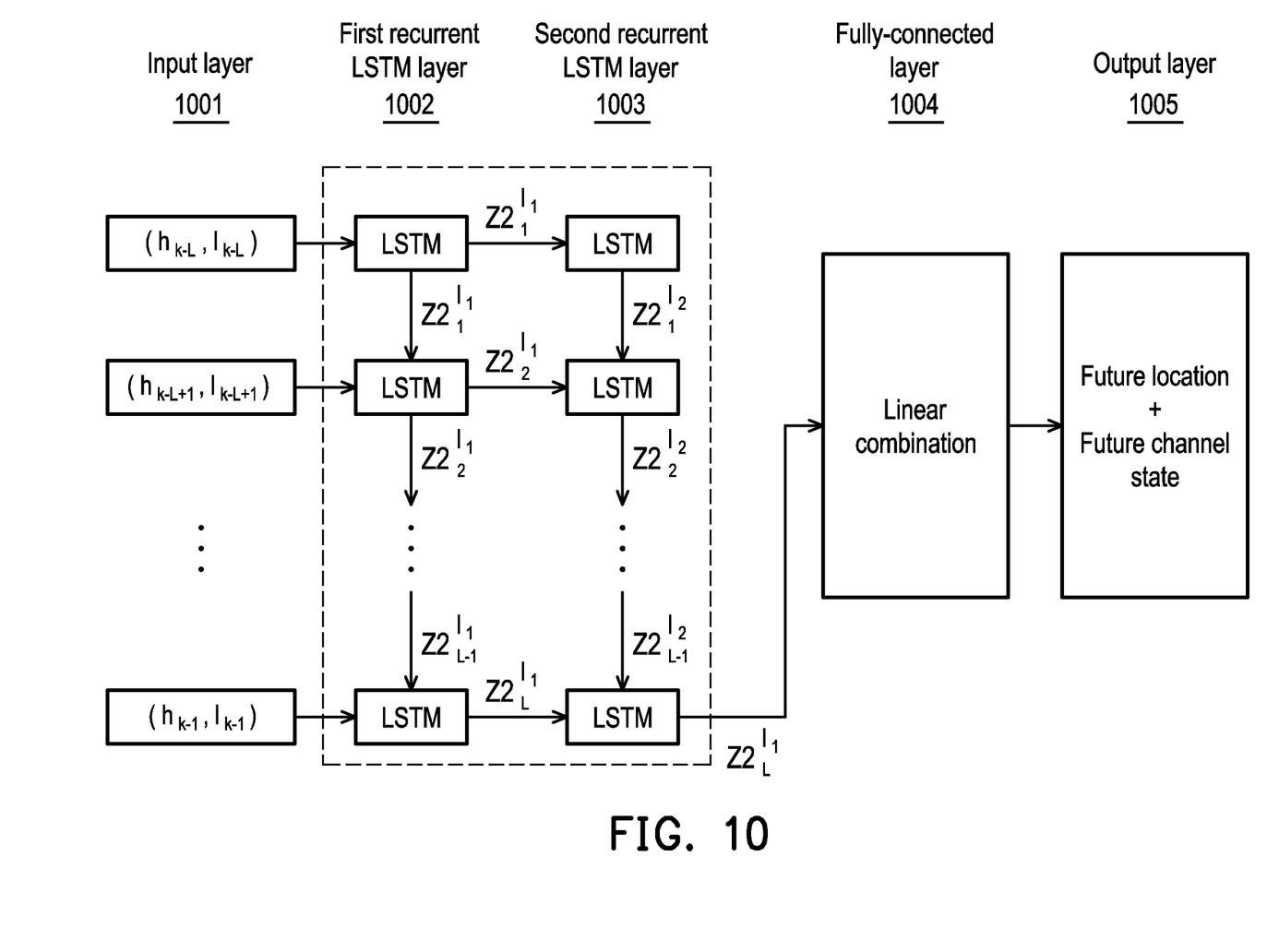
FIG. 10 is a schematic diagram of a location and channel prediction model according to an embodiment of the disclosure.

FIG. 10 is a schematic diagram of a location and channel prediction model according to an embodiment of the disclosure. Please refer to FIG. 10. In an embodiment, the location and channel prediction model is a recurrent neural network (LRNet) based on an LSTM layer. The location and channel prediction model includes an input layer 1001, a first recurrent LSTM layer 1002, a second recurrent LSTM layer 1003, a fully-connected layer 1004, and an output layer 1005.

The input layer 401 obtains multiple past locations $l_{k-L}$, $l_{k-L+1}, \ldots, l_{k-1}$ and multiple past channel states $h_{k-L}$, $h_{k-L+1}, \ldots, h_{k-1}$, where L is a positive integer greater than 1. The first recurrent LSTM layer 1002 includes multiple LSTM models, and the second recurrent LSTM layer 1003 includes multiple LSTM models. The LSTM models have a one-to-one correspondence with the past locations $l_{k-L}$, $l_{k-L+1}, \ldots, l_{k-1}$ and the past channel states $h_{k-L}$, $h_{k-L+1}, \ldots, h_{k-1}$ in the input layer 401. For the explanation of the LSTM model, reference may be made to the description of FIG. 4, which will not be repeated here.

The processor 23 may transmit the output thereof to the first LSTM model in the second recurrent LSTM layer 1003 and the second LSTM model (corresponding to the next time point of the first LSTM model) in the first recurrent LSTM layer 1002 through a first LSTM model in the first recurrent LSTM layer 1002. For example, an output $z2_1^{l_1}$ (where l1 represents belonging to the first recurrent LSTM layer 1002) of the first LSTM model from top to bottom of the drawing in the first recurrent LSTM layer 1002 is transmitted to the first LSTM model from top to bottom of the drawing in the second recurrent LSTM layer 1003 and is stored in the second LSTM model of the first recurrent LSTM layer 1002. By analogy, an output $z2_2^{l_1}$ of the second LSTM model of the first recurrent LSTM layer 1002 is transmitted to the second LSTM model of the second recurrent LSTM layer 1003 and a third LSTM model (not shown) of the first recurrent LSTM layer 1002. Since an L-th LSTM model of the first recurrent LSTM layer 1002 has no corresponding LSTM model at the next time point, an output $z2_L^{l_1}$ thereof is only transmitted to an L-th LSTM model of the second recurrent LSTM layer 1003.

Furthermore, the processor 23 transmits the output thereof to the second LSTM model in the second recurrent LSTM layer 1003 (corresponding to the next time point of the first LSTM model) through the first LSTM model in the second recurrent LSTM layer 1003. For example, an output $z2_1^{l_2}$ (where l2 represents belonging to the second recurrent LSTM layer 1003) of the first LSTM model from top to bottom of the drawing in the second recurrent LSTM layer 1003 is stored in the second LSTM model in the second recurrent LSTM layer 1003. By analogy, an output $z2_2^{l_2}$ of the second LSTM model of the second recurrent LSTM layer 1003 is stored in the third LSTM model (not shown) of the second recurrent LSTM layer 1003. Since the L-th LSTM model of the second recurrent LSTM layer 1003 has no corresponding LSTM model at the next time point, an output $z2_L^{l_2}$ thereof is only transmitted to the fully-connected layer 1004, where the output $z2_L^{l_2}$ may be defined as:

$$z2_L^{l_2} = f2_\lambda(H_k, U_k) \quad (7)$$

where $U_k$ is a set of the past locations $l_{k-L}, l_{k-L+1}, \ldots, l_{k-1}$ (for example, $U_k = [l_{k-L}, \ldots, l_{k-1}]$) of the user equipment 19, $H_k$ is a set of the past channel states (for example, $H_k = [h_{k-L}, \ldots, h_{k-1}]$) corresponding to the past locations $u_{k-L}, u_{k-L+1}, \ldots, u_{k-1}$ of the user equipment 19, and $f2_\lambda(\ )$ is a nonlinear function using the parameter $\lambda$ (for implementing the first recurrent LSTM layer 1002 and the second recurrent LSTM layer 1003).

The processor 23 linearly combines the output $z2_L^{l_2}$ of the second recurrent LSTM layer 1003 through the fully-connected layer 1004 to obtain the future location and the future channel state (that is, output the future location and the future channel state through the output layer 405). The linear combination is defined as follows:

$$(\tilde{h}_k, \tilde{u}_k) = \sigma(W2 f2_\lambda(H_k, U_k) + b2) \quad (8)$$

where $\tilde{u}_k$ is the estimated future location, $\tilde{h}_k$ is an estimated future location, $\sigma(\ )$ represents the linear activation function, W2 is a weight, and b2 is a bias.

Please refer to FIG. 9, the processor 23 determines the precoder according to the future location and the future channel state (Step S920). Specifically, the difference from Step S320 of FIG. 3 is that the determination of the precoder also considers the future channel state.

In an embodiment, the processor 23 may judge whether the memory 22 or other databases have a codebook. In response to not having the codebook, the processor 23 may determine the precoder according to a predicted future channel state. For example, the future channel state in an output of the location and channel prediction model is used as the precoder. In response to having the codebook, the processor 23 may obtain the precoder that satisfies a condition. In an embodiment, the processor 23 may generate the precoder according to the one with the highest correlation with the predicted future channel state among multiple precoding matrices in the codebook. For example, the processor 23 finds a precoding matrix (for example, $h_i$) that maximizes the normalized correlation (for example, $$\frac{|W_i^H h_i|^2}{\|h_i\|_2^2})$$

in the codebook. That is, if the normalized correlation is the maximum, the condition is satisfied.

In another embodiment, whether there is the codebook, the processor 23 may directly use the predicted future channel state (in matrix form) as the precoder.

Please refer to FIG. 9. The processor 23 determines the direction of the beam of the base station (for example, the O-eNB 18) at the future time point according to the precoder (Step S930). Specifically, the precoding is a technical measure to implement digital beamforming. If the signals on the antennas of the base station are precoded, the beam is formed. Since the embodiment of the disclosure can predict the future location of the user equipment 19 at the future time point, the main lobe of the beam may be approximately toward the user equipment 19 at the future time point.

In the embodiment of FIG. 9, a displacement status of the user equipment 19 is considered. In addition, considering the SINRs at different time points, a precoder $W_k$ at the time point k found through the machine learning model can have an optimal $SINR_k$ compared to a precoder $W_i$ at another time point i:

$$y_k = h_k^H x + n_k \quad (9)$$

$$SINR_k = \frac{|h_k^H w_k|^2}{\sigma_k^2 + \Sigma_{i \neq k}|h_k^H w_k|^2} \quad (10)$$

In summary, in the scheduling method for beamforming and the network entity according to the embodiments of the disclosure, the future location (and the future channel state) is predicted according to the past locations (and the past channel states), and the precoder is determined accordingly, so that the beam of the base station can be directed to the user equipment at the future time point. Thereby, the system efficiency and the utilization of radio resources can be improved. In addition, even if the user equipment delays reporting the channel state, the precoding processing can be provided in real time in response to the channel state, thereby improving the communication quality of the user equipment during the moving process.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A scheduling method for beamforming, applicable to a network entity, the scheduling method comprising:
   predicting a future location according to at least one past location of a user equipment (UE), wherein the at least one past location is a location of the user equipment of at least one past time point, and the future location is a location of the user equipment at a future time point;

determining a precoder according to the future location, wherein the precoder reflects a downlink channel state at the future time point; and determining a direction of a beam of a base station at the future time point according to the precoder.

2. The scheduling method for beamforming according to claim 1, wherein the step of predicting the future location according to the at least one past location of the user equipment comprises:

inputting the at least one past location to a location prediction model, wherein the location prediction model is based on a machine learning algorithm; and predicting the future location through the location prediction model.

3. The scheduling method for beamforming according to claim 2, wherein the location prediction model comprises a first recurrent long short-term memory (LSTM) layer and a second recurrent LSTM layer, the first recurrent LSTM layer and the second recurrent LSTM layer respectively comprise a plurality of LSTM model, and the step of predicting the future location through the location prediction model comprises:

transmitting an output to a first LSTM model in the second recurrent LSTM layer and a second LSTM model in the first recurrent LSTM layer through a first LSTM model in the first recurrent LSTM layer; and transmitting an output to a second LSTM model in the second recurrent LSTM layer through the first LSTM model in the second recurrent LSTM layer.

4. The scheduling method for beamforming according to claim 3, wherein the location prediction model further comprises a fully-connected (FC) layer, and the step of predicting the future location through the location prediction model comprises:

linearly combining an output of the second recurrent LSTM layer through the fully-connected layer to obtain the future location.

5. The scheduling method for beamforming according to claim 1, wherein the step of determining the precoder according to the future location comprises:

inputting the future location to a precoding prediction model, wherein the precoding prediction model is based on a machine learning algorithm;

predicting a candidate precoder through the precoding prediction model; and determining the precoder according to the candidate precoder.

6. The scheduling method for beamforming according to claim 5, wherein the precoding prediction model comprises a feature extraction layer and a multilayer perceptron (MLP), and the step of predicting the precoder through the precoding prediction model comprises:

obtaining a plurality of random Fourier features (RFFs) from the future location through the feature extraction layer; and determining the candidate precoder according to the random Fourier features through the multilayer perceptron.

7. The scheduling method for beamforming according to claim 5, wherein the step of determining the precoder according to the candidate precoder comprises:

in response to having a codebook, generating the precoder according to a one with a highest correlation with the candidate precoder among a plurality of precoding matrices in the codebook; and in response to not having the codebook, using the candidate precoder as the precoder.

8. A scheduling method for beamforming, applicable to a network entity, the scheduling method comprising:

predicting a future location and a future channel state according to at least one past location and at least one past channel state of a user equipment, wherein the at least one past location is a location of the user equipment of at least one past time point, the at least one past channel state is a downlink channel state at the at least one past time point, the future location is a location of the user equipment at a future time point, and the future channel state is a downlink channel state at the future time point;

determining a precoder according to the future location and the future channel state, wherein the precoder reflects a downlink channel situation at the future time point; and determining a direction of a beam of a base station at the future time point according to the precoder.

9. The scheduling method for beamforming according to claim 8, wherein the step of predicting the future location and the future channel state according to the at least one past location of the user equipment comprises:

inputting the at least one past location and the at least one past channel state to a location and channel prediction model, wherein the location and channel prediction model is based on a machine learning algorithm; and predicting the future location and the future channel state through the location and channel prediction model.

10. The scheduling method for beamforming according to claim 9, wherein the location and channel prediction model comprises a first recurrent long short-term memory (LSTM) layer and a second recurrent LSTM layer, the first recurrent LSTM layer and the second recurrent LSTM layer respectively comprise a plurality of LSTM models, and the step of predicting the future location through the location and channel prediction model comprises:

transmitting an output to a first LSTM model in the second recurrent LSTM layer and a second LSTM model in the first recurrent LSTM layer through a first LSTM model in the first recurrent LSTM layer; and transmitting an output to a second LSTM model in the second recurrent LSTM layer through the first LSTM model in the second recurrent LSTM layer.

11. The scheduling method for beamforming according to claim 10, wherein the location and channel prediction model further comprises a fully-connected layer, and the step of predicting the future location and the future channel state through the location and channel prediction model comprises:

linearly combining an output of the second recurrent LSTM layer through the fully-connected layer to obtain the future location and the future channel state.

12. The scheduling method for beamforming according to claim 8, wherein the step of determining the precoder according to the future location and the future channel state comprises:

in response to having a codebook, generating the precoder according to a one with a highest correlation with the future channel state among a plurality of precoding matrices in the codebook; and in response to not having the codebook, determining the precoder according to the future channel state.

13. A network entity, comprising:
a memory, used to store a code; and
a processor, coupled to the memory and configured to load and execute the code to:
  predict a future location according to at least one past location of a user equipment, wherein the at least one past location is a location of the user equipment of at least one past time point, and the future location is a location of the user equipment at a future time point;
  determine a precoder according to the future location, wherein the precoder reflects a downlink channel state at the future time point; and
  determine a direction of a beam of a base station at the future time point according to the precoder.

14. The network entity according to claim 13, wherein the processor is further configured to:
  input the at least one past location to a location prediction model, wherein the location prediction model is based on a machine learning algorithm; and
  predict the future location through the location prediction model.

15. The network entity according to claim 14, wherein the location prediction model comprises a first recurrent long short-term memory (LSTM) layer and a second recurrent LSTM layer, the first recurrent LSTM layer and the second recurrent LSTM layer respectively comprise a plurality of LSTM models, and the processor is further configured to:
  transmit an output to a first LSTM model in the second recurrent LSTM layer and a second LSTM model in the first recurrent LSTM layer through a first LSTM model in the first recurrent LSTM layer; and
  transmit an output to a second LSTM model in the second recurrent LSTM layer through the first LSTM model in the second recurrent LSTM layer.

16. The network entity according to claim 15, wherein the location prediction model further comprises a fully-connected layer, and the processor is further configured to: linearly combine an output of the second recurrent LSTM layer through the fully-connected layer to obtain the future location.

17. The network entity according to claim 15, wherein the processor is further configured to:
  input the future location to a precoding prediction model, wherein the precoding prediction model is based on a machine learning algorithm;
  predict a candidate precoder through the precoding prediction model; and
  determine the precoder according to the candidate precoder.

18. The network entity according to claim 17, wherein the precoding prediction model comprises a feature extraction layer and a multilayer perceptron (MLP), and the processor is further configured to:
  obtain a plurality of random Fourier features (RFFs) from the future location through the feature extraction layer; and
  determine the candidate precoder according to the random Fourier features through the multilayer perceptron.

19. The network entity according to claim 18, wherein the processor is further configured to:
  in response to having a codebook, generate the precoder according to a one with a highest correlation with the candidate precoder among a plurality of precoding matrices in the codebook; and
  in response to not having the codebook, use the candidate precoder as the precoder.

20. The network entity according to claim 13, wherein the network entity is implemented by at least one of a radio access network intelligent controller (RIC), an open radio access network central unit (O-CU), and an open radio access network distributed unit (O-DU) in an open radio access network (O-RAN).

* * * * *